US010000142B2

(12) United States Patent
Davis (10) Patent No.: US 10,000,142 B2
(45) Date of Patent: Jun. 19, 2018

(54) HEAD AND NECK RESTRAINING SYSTEM

(71) Applicant: George Davis, Sarver, PA (US)

(72) Inventor: George Davis, Sarver, PA (US)

( * ) Notice: Subject to any disclaimer, the term of this patent is extended or adjusted under 35 U.S.C. 154(b) by 0 days. days.

(21) Appl. No.: 15/135,742

(22) Filed: Apr. 22, 2016

(65) Prior Publication Data

US 2016/0236596 A1   Aug. 18, 2016

Related U.S. Application Data

(63) Continuation of application No. 14/626,194, filed on Feb. 19, 2015, now Pat. No. 9,321,383, which is a continuation of application No. 13/668,387, filed on Nov. 5, 2012, now Pat. No. 8,967,720.

(60) Provisional application No. 61/555,039, filed on Nov. 3, 2011.

(51) Int. Cl.
  *B60N 2/28* (2006.01)
  *B60N 2/42* (2006.01)
  *B60N 2/48* (2006.01)
  *B60R 22/00* (2006.01)

(52) U.S. Cl.
  CPC ......... *B60N 2/4885* (2013.01); *B60N 2/2851* (2013.01); *B60N 2/2872* (2013.01); *B60N 2/882* (2018.02); *B60N 2/885* (2018.02); *B60N 2/888* (2018.02); *B60R 22/001* (2013.01)

(58) Field of Classification Search
  CPC .. B60N 2/4885; B60N 2/2851; B60N 2/4882; B60N 2/4879; B60N 2/2872; B60R 22/001
  See application file for complete search history.

(56) References Cited

U.S. PATENT DOCUMENTS

| | | | | |
|---|---|---|---|---|
| 3,170,659 A * | 2/1965 | Wood, Jr. | ............... | B64D 25/06 244/122 B |
| 3,296,634 A * | 1/1967 | Rusnak | ................... | A47C 7/383 297/393 |
| 3,568,890 A * | 3/1971 | Leachman | ........... | B60N 2/4876 222/183 |
| 3,892,399 A * | 7/1975 | Cabansag | ............ | A61B 6/0421 128/870 |
| 4,506,664 A * | 3/1985 | Brault | ................. | A61F 5/05883 5/628 |
| 4,664,341 A * | 5/1987 | Cummings | ............ | B64D 25/02 128/857 |
| 4,913,491 A * | 4/1990 | Mizuno | ................ | B60N 2/4492 297/284.9 |
| 5,154,186 A * | 10/1992 | Laurin | .................... | A61F 5/058 5/625 |
| 6,270,161 B1 * | 8/2001 | De Filippo | .......... | B60N 2/4817 297/391 |
| 6,648,416 B2 * | 11/2003 | O'Connor | .............. | A47C 7/383 297/397 |
| 7,832,802 B2 * | 11/2010 | Ehlers | ...................... | A47C 7/38 297/393 |

(Continued)

*Primary Examiner* — Elizabeth A Quast
(74) *Attorney, Agent, or Firm* — The Webb Law Firm (57) ABSTRACT

In a method of head and neck restraint the head of a subject is secured to a head and neck restraint assembly that limits movement of the head. In response to sudden force in a first direction, whereupon the head of the subject experiences a force in a second direction, the head and neck restraint assembly controls deceleration of the head in the second direction and avoids rebounding of the head after deceleration.

7 Claims, 7 Drawing Sheets

(56) References Cited

U.S. PATENT DOCUMENTS

| | | | |
|---|---|---|---|
| 8,029,055 B2* | 10/2011 | Hartlaub | B60N 2/4838 297/216.12 |
| 2003/0030309 A1* | 2/2003 | Pal | B60N 2/427 297/216.12 |
| 2004/0026979 A1* | 2/2004 | Haddon | A47C 16/00 297/393 |
| 2005/0179300 A1* | 8/2005 | O'Connor | A47C 7/383 297/391 |
| 2007/0145802 A1* | 6/2007 | Frano | A61G 5/12 297/393 |

* cited by examiner

HEAD AND NECK RESTRAINING SYSTEM

CROSS REFERENCE TO RELATED APPLICATIONS

This application is a continuation of U.S. patent application Ser. No. 14/626,194, filed Feb. 19, 2015 (now U.S. Pat. No. 9,321,383, issued Apr. 26, 2016), which is a continuation of U.S. patent application Ser. No. 13/668,387, filed Nov. 5, 2012 (now U.S. Pat. No. 8,967,720, issued Mar. 3, 2015), which claims priority from U.S. provisional patent application no. 61/555,039, filed Nov. 3, 2011, all of which are incorporated herein by reference.

BACKGROUND OF THE INVENTION

Field of the Invention

The present invention relates to a head and neck restraint system for use in vehicles for avoiding head and neck injuries.

Description of Related Art

Heretofore, head and neck restraints were not designed to absorb impact forces and minimize stresses in several directions. In this regard, such prior art head and neck restraints do not avoid or reduce the force applied to the head and neck that causes additional injuries due to neck roll or violent, sudden movement (e.g., as might occur in a crash or accident), in a number of directions.

SUMMARY OF THE INVENTION

Disclosed herein is a head and neck restraint system that comprises a vertical support; and a head and neck restraint assembly coupled to said vertical support, said head and neck restraint assembly comprising a pair of spaced members coupled to said vertical support, said pair of spaced members having a spring memory that permits movement of one of said members toward and away from the other member or movement of both of said members toward and away from each other; and means for avoiding the spring memory from returning one or both of said members to a starting position prior to movement after movement of one of said members toward the other member or movement of both of said members towards each other.

The means for avoiding can include a base supporting the pair of spaced members in spaced relation; a back plate supported by the vertical support and supporting the base in spaced relation to the back plate; and means for moving into the space between the back plate and the base in response to movement of one of said members towards the other member or movement of both of said members toward each other thereby avoiding the spring memory thereof from returning said member(s) to the starting position prior to movement.

The means for moving can include a wedge that is biased toward the space between the back plate and the base and which, in response to an increase in the space between the back plate and the base, moves into said increased space thereby avoiding the spring memory from returning at least one of said members to a starting position prior to movement of said at least one member.

The means for moving can include a pair of wedges that are spring biased together toward the space between the back plate and the base.

The head and neck restraint system can further include a head restraint configured to be mounted to a head of subject; and means coupled between the spaced members and the head restraint.

The means coupled between the spaced members and the head restraint can include a pair of flexible connections coupled in spaced relation to each side of the head restraint, wherein each pair of flexible connections opposite the head restraint is coupled to one of the pair of spaced members.

Each pair of flexible connections opposite the head restraint can be slidably coupled to one of the spaced members.

Each pair of flexible connections opposite the head restraint can be coupled to a slide which is slidable on a rod or rail of the one spaced member.

Each flexible connection can be a cord or a cable.

The pair of spaced members and the base of the means for avoiding can be substantially U-shaped, with the pair of spaced members defining arms of the U-shape and with the base of the means for avoiding defining the base of the U-shape.

DETAILED DESCRIPTION OF THE INVENTION

The present invention will be described with reference to the accompanying figures where like reference numbers correspond to like elements.

With reference to FIGS. 1-5, a head and neck restraint system 1 that can be incorporated as a seat insert in a pre-existing seat, such as, without limitation, a child safety seat (CS), includes a vertical frame 4 which supports a head and neck restraint assembly 12 at a desired position on frame 4 in a manner described hereinafter. Although head and neck restraint system 1 is shown as an insert on a pre-existing child safety seat (CS), it is envisioned that head and neck restraint system 1 can be formed as part of and integral with CS or any other vehicle seat.

Figure 1:
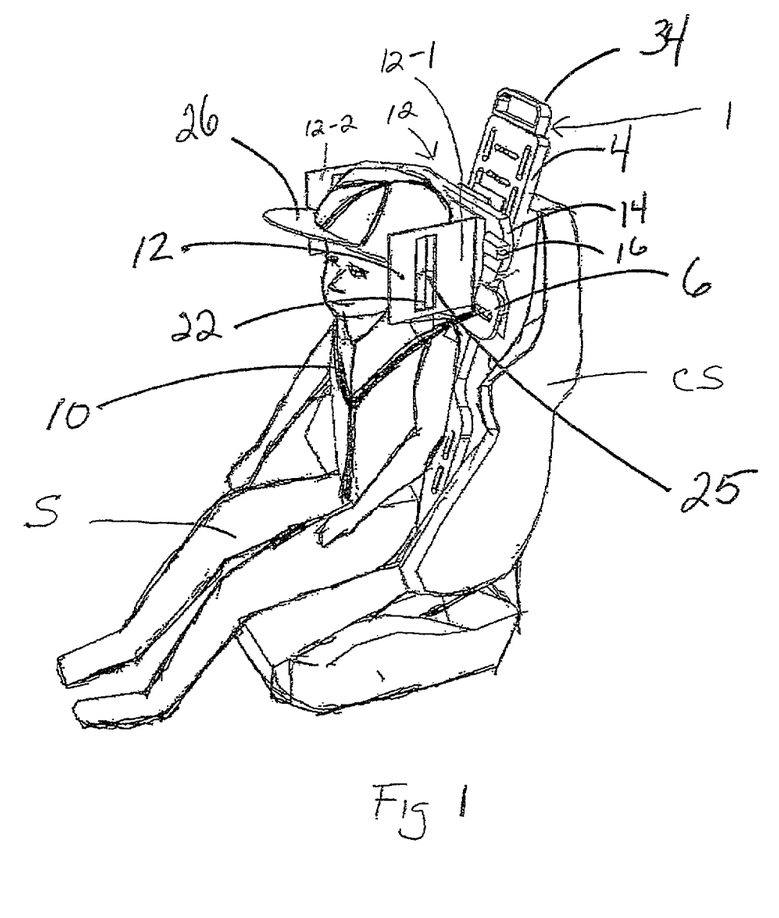
FIG. 1 is a perspective view of a head and neck restraint system of the present invention in a child seat that can be installed in motor vehicles.
Figure 2:
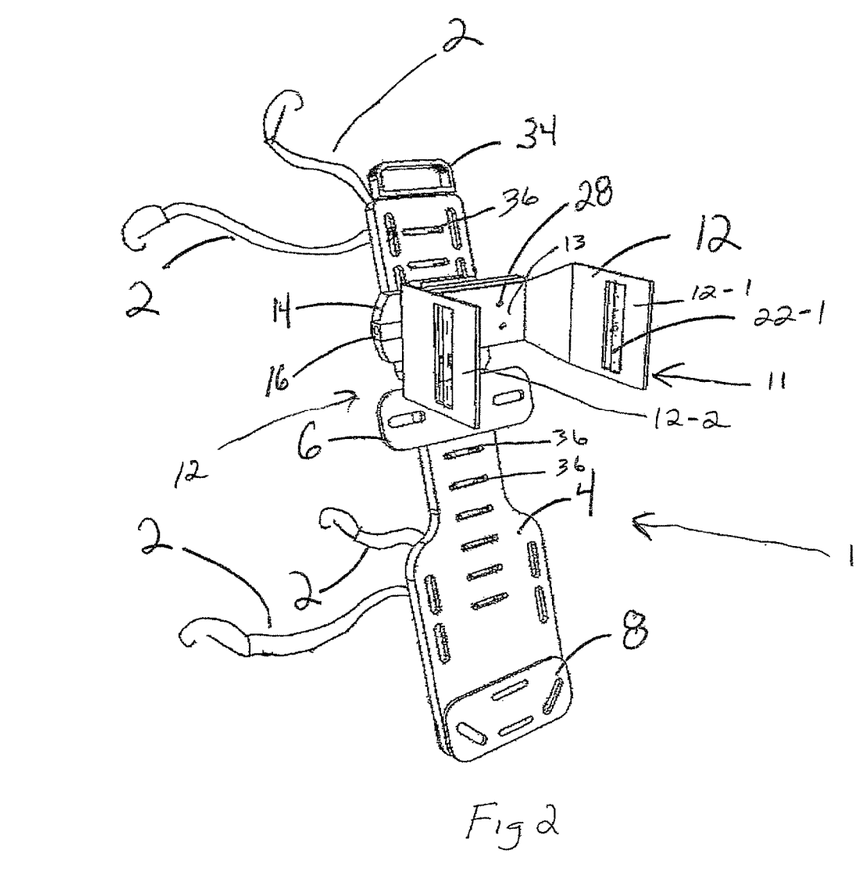
FIG. 2 is an isolated perspective view of the head and neck restraint system shown in FIG. 1.

Head and neck restraint system 1 can be placed onto the back of seat CS and can be attached to seat CS or a vehicle's latch system via a series of straps 2. Frame 4 includes an adjustable upper belt bracket 6 and a lower belt bracket 8 that receives opposite ends of a harness 10 that holds a subject S (a child) in place with respect to frame 4 and head and neck restraint assembly 12. Upper belt bracket 6 is desirably adjustable on frame 4 for height for proper fit to subject S.

Figure 3:
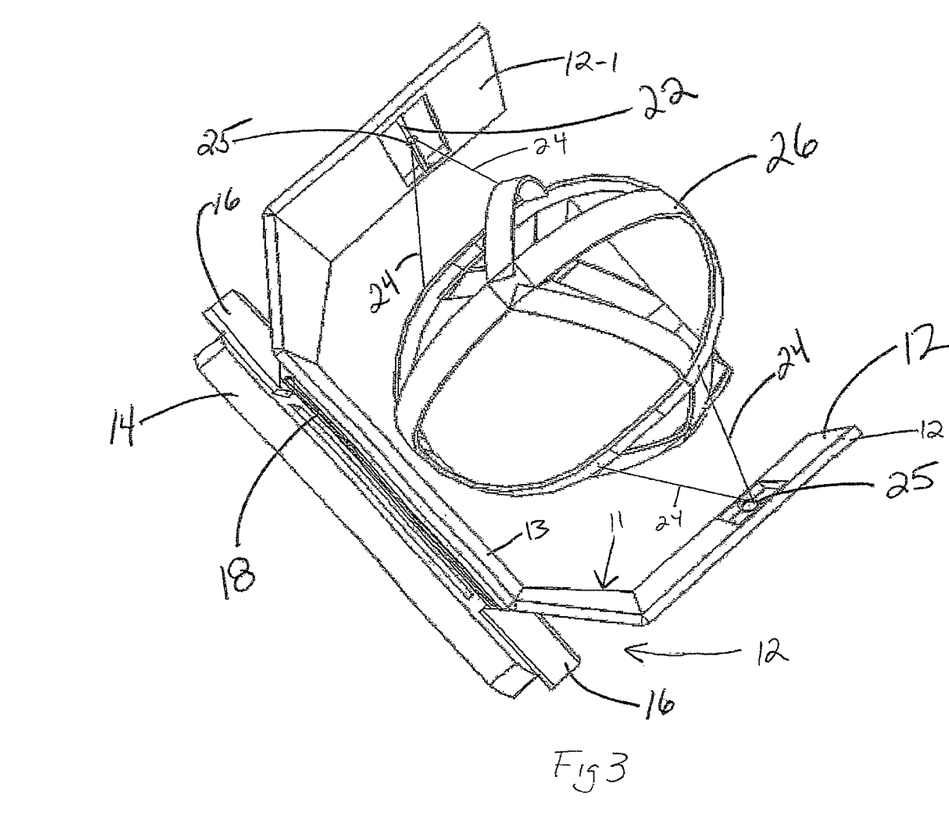
FIG. 3 is an isolated perspective view of the head and neck restraint assembly of the head and neck restraint system shown in FIG. 2.
Figure 4:
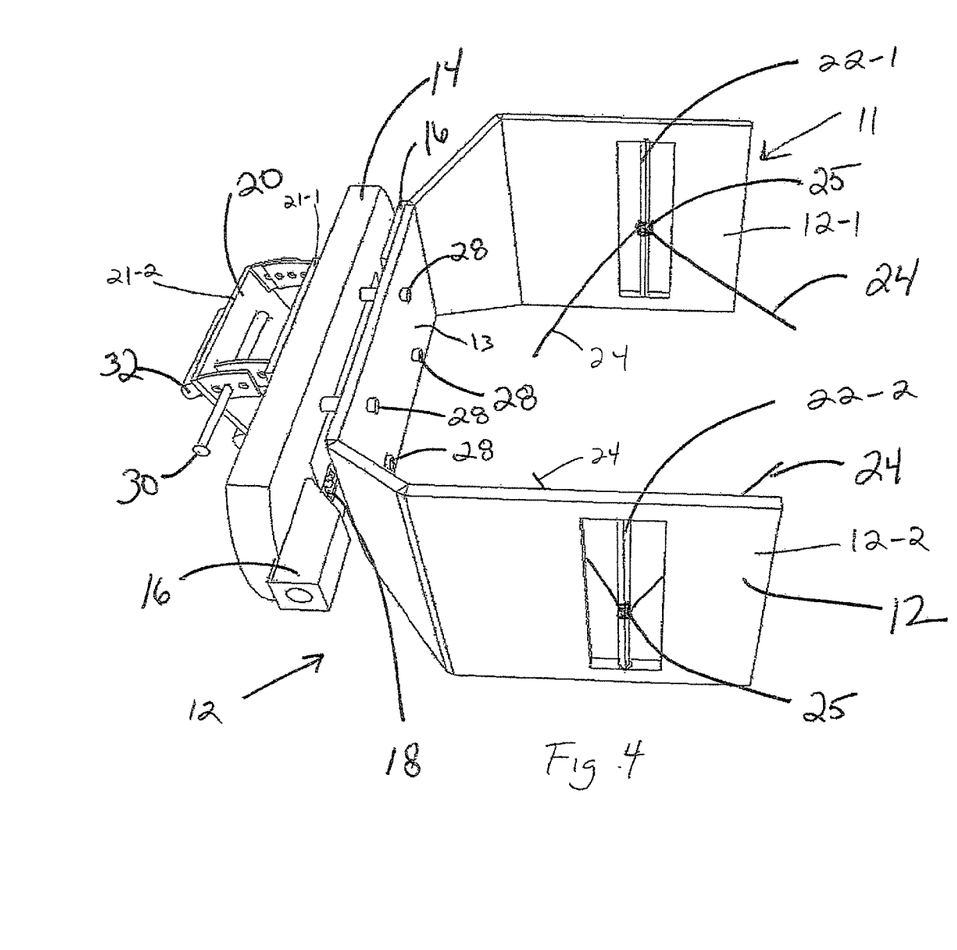
FIG. 4 is another perspective view of the head and neck restraint assembly of FIG. 3 coupled to an adjustable bracket used with the head and neck restraint system shown in FIG. 1.
Figure 5:
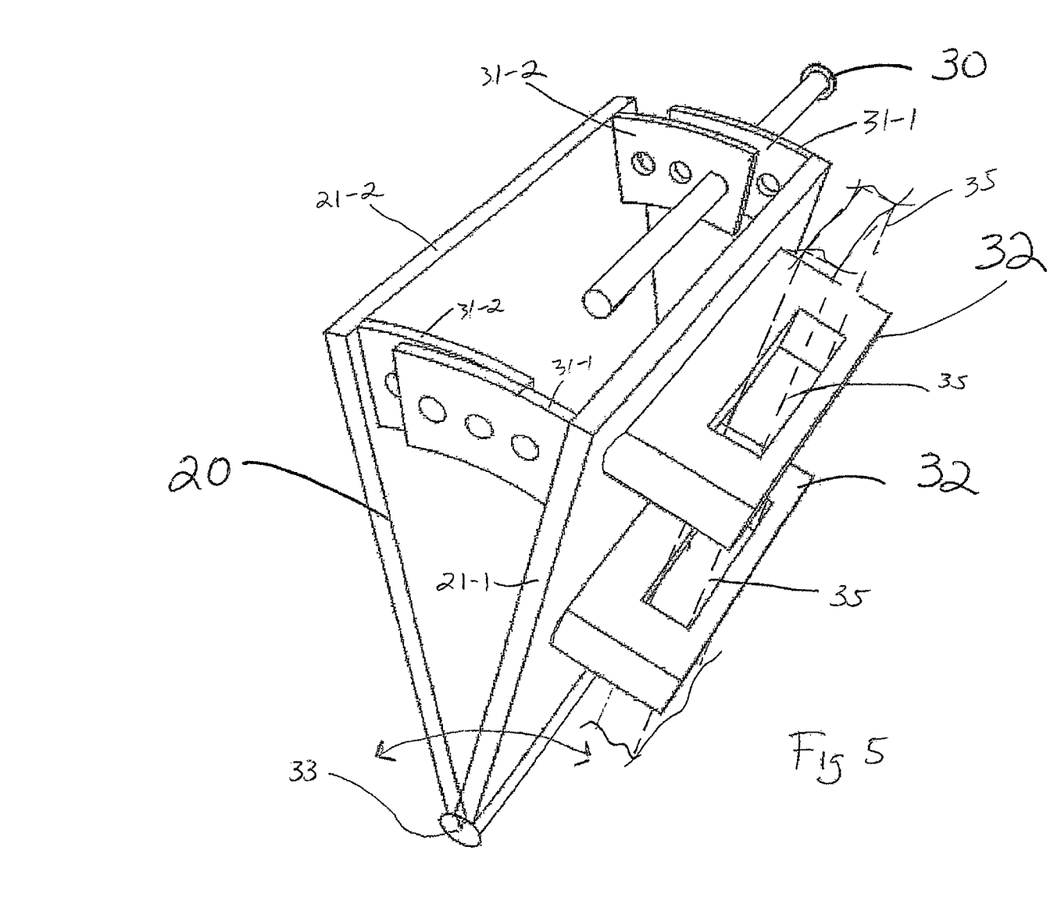
FIG. 5 is an isolated perspective view of the adjustable bracket shown in FIG. 4.

Head and neck restraint assembly 12 includes a generally U-shaped bracket 11 that includes a base 13 and a pair of spaced arms 12-1 and 12-2. Base 13 is attached in spaced relation to a back plate 14 by a system of two wedges 16 and a spring 18 disposed therebetween. Spring 18 pulls wedges 16 together into the space between base 13 and back plate 14 thereby preventing rebounding of one or both of arms 12-1 and 12-2 upon flexing or bending in response to an impact force (described hereinafter). Spring 18 floats in the space between base 13 and back plate 14. Frictional interaction between wedges 16, base 13, and back plate 14 supports the combination of spring 18 and wedges 16 between base 13 and back plate 14 in the position shown (FIG. 3).

Back plate 14 is attached to an adjustable bracket 20 (FIG. 4) that enables the orientation of U-shaped bracket 11 to be adjusted as necessary relative to the head H of subject S. Arms 12-1 and 12-2 include rods or rails 22-1 and 22-2, respectively, that in use are positioned substantially vertically on either side of head H of subject S. Disposed for slidable movement on each rod or rail 22 is a slide 25 that slides along the length of said rod or rail 22 so that dual cables 24 attached to each slide 25 will consistently pull straight any head restraint device 26 coupled between said dual cables 24 and head H of subject S in response to an impact force.

Each dual cable 24 fastens to both the front and rear of a head restraint device 26 to be worn on head H of subject S to avoid head H and the neck of subject S from rotating in response to a vehicle which carries seat CS and subject S experiencing a sudden force, such as a sudden impact from being hit by another vehicle or from hitting another stationary or moving object. In other words, in response to an impact force (discussed hereinafter), head restraint 26 in combination with dual cables 24 and slides 25 riding up and down on rods or rails 22-1 and 22-2 act to avoid sudden rotation of head H and the neck of subject S, and act to constrain head H and the neck of subject S to look in a forward direction substantially perpendicular to base 13, thereby avoiding potential head and neck injuries due to said impact.

Base 13 attached to back plate 14 via fasteners 28 keeps spring 18 and wedges 16 in place via friction between wedges 16, base 13 and back plate 14. Adjustable bracket 20 includes a pair of pivotally connected plates 21-1 and 21-2 that include pairs of brackets 31-1 and 31-2 opposite the pivot axis 33 of plates 21-1 and 21-2. Pivoting plates 21-1 and 21-2 about axis 33 moves brackets 31-1 and 31-2 in an arcuate path adjacent each other to align holes in brackets 31-1 and 32-2 to receive a pin 30 through said holes to fix the position of plates 21-1 and 22-2 in a desired position. Adjustable bracket 20, upper bracket 6, and lower bracket 8 each includes one or more slotted engagement brackets 32 (only brackets 32 on adjustable bracket 20 are shown) on a rear side thereof that in use are projected through slots 36 in frame 4 and are held in place by a rack 34 that includes an elongated blade like structure 35 (shown in phantom in FIG. 5) that is lowered through the slots in said brackets 32 to secure adjustable plate 20, upper bracket 6, and lower bracket 8 in place on frame 4.

Figure 6:
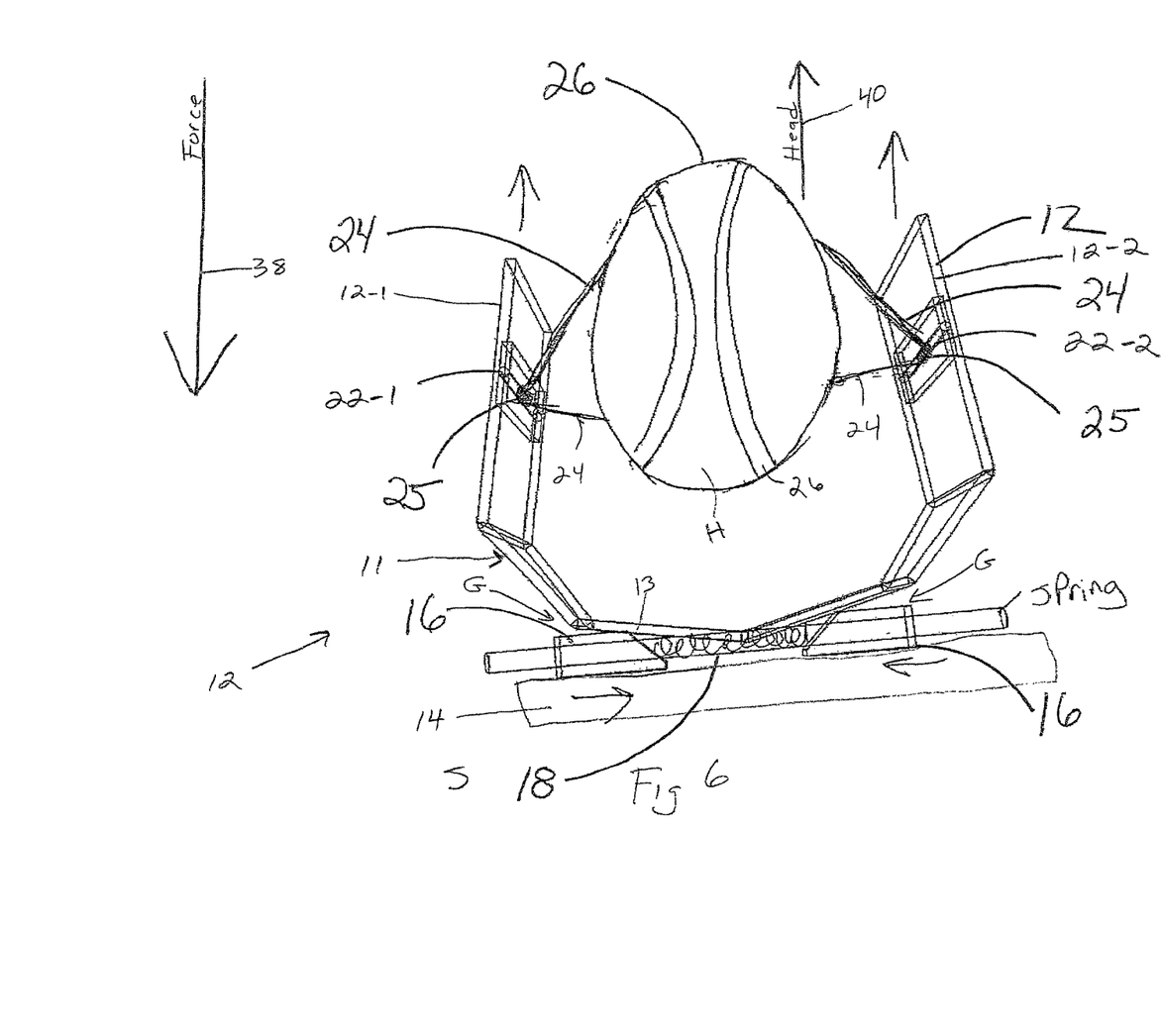
FIG. 6 is an isolated top-down view of the response of the head and neck restraint assembly of FIG. 3 to an applied forward impact force avoiding unconstrained movement of the head and neck of a subject.

With reference to FIG. 6 and with continuing reference to FIGS. 1-5, an isolated view of head and neck restraint assembly 12 is shown. In response to a sudden force directed in the direction shown by arrow 38, head H of subject S will experience a force in the direction shown by arrow 40. In response, dual cables 24 on either side of head restraint device 26 secured to head H will pull against slides 25 which, as necessary, slide along the axes on rods or rails 22-1 and 22-2. In response, the semi-rigid material forming U-shaped bracket 11 will cause arms 12-1 and 12-2 to flex inwardly towards head H of subject S absorbing the force of head H moving in the direction shown by arrow 40 in response to the sudden impact force in the direction of arrow 38. The pair of dual cables 24, the pair of slides 25, rods 22-1 and 22-2, and arms 12-1 and 12-2 act to limit the movement of head H and decelerate head H in a manner that helps avoid injury to the neck and head H of subject S.

U-shaped bracket 11 is formed from a material that is semi-rigid but is capable of bending or flexing as shown in FIG. 6. This material also has a spring memory that acts to rebound arms 12-1 and 12-2 back to the starting position shown in FIG. 3. To avoid this rebound after arms 12-1 and 12-2 have flexed to the position shown in FIG. 6, thereby potentially injuring the head H and neck of subject S, spring 18 urges wedges 16 together into the gaps G formed between back plate 14 and base 13 in response to the flexing or bending of arms 12-1 and 12-2 and base 13 as shown in FIG. 6. In other words, wedges 16 moving together as shown in FIG. 6 in response to base 13 and arms 12-1 and 12-2 bending in response to head H moving in the direction of arrow 40 avoids base 13 and arms 12-1 and 12-2 from rebounding to their starting position (shown in FIG. 3), thereby avoiding the application of an unwanted rebound force to the head H or neck of subject S after U-shaped bracket has helped dissipate the force applied to head H in the direction shown by arrow 40.

Figure 7:
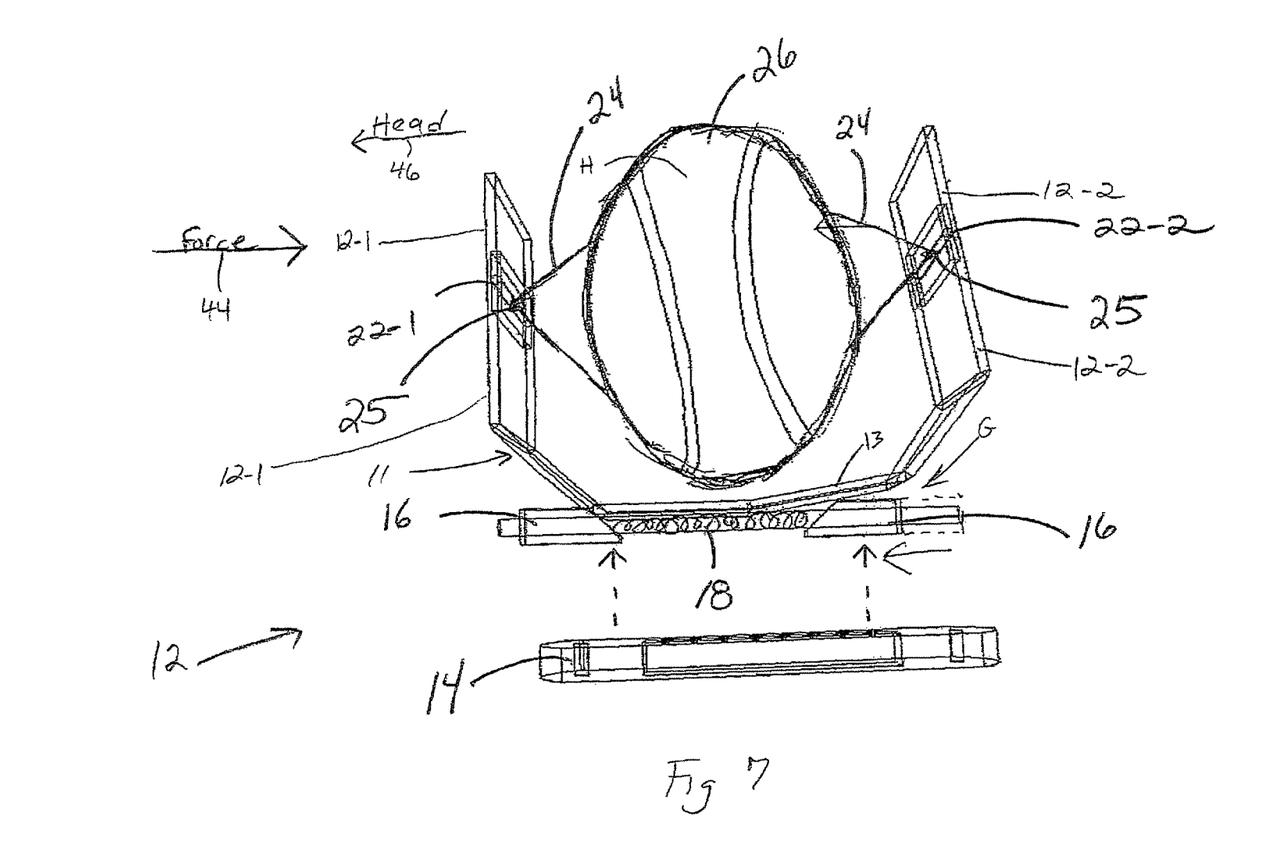
FIG. 7 is an isolated top-down view of the response of the head and neck restraint assembly shown in FIG. 3 to an applied lateral impact force avoiding unconstrained movement of the head and neck of a subject.

With reference to FIG. 7 and with continuing reference to all previous figures, head and neck restraint assembly 12 can also act to prevent injury to the head H and neck of subject S in response to a sudden lateral impact force shown by arrow 44 in FIG. 7. In response to force 44, head H will experience a force in the direction of arrow 46. In response to head H experiencing this force in the direction of arrow 46, head restraint device 26 coupled to head H will pull on the dual cables 24 coupled to rod or rail 22-2 causing arm 12-2 of U-shaped bracket 11 to move in the direction of arrow 46 thereby dissipating the energy of the force 44 and avoiding injury to the head H and neck of subject S. Because head H is experiencing a force only in the direction of arrow 46, only arm 12-2 moves in the direction of arrows 46 and responds to said force 46. Because head H is moving toward arm 12-1, arm 12-1 does not flex or bend in response to the force applied in the direction of arrow 46 to H.

As can be seen in FIG. 7, the movement of arm 12-2 in the direction of arrow 46 causes arm 12-2 and the side of base 13 coupled to arm 12-2 to flex or bend away from back plate 14, whereupon spring 18 pulls the right wedge 16 (in FIG. 7) into the gap G thus formed on the right side (in FIG. 7) between base 13 and back plate 14 thereby avoiding rebound of arm 12-2 in the direction opposite the force shown by arrow 44 and avoiding potential injury to the head H and neck of subject S due to the rebound of arm 12-2 that would otherwise occur.

As can be seen, head and neck restraint assembly 12 absorbs impact force(s) by bending of the material that it is constructed of. As a result, in response to the head H of subject S moving in a direction opposite the impact force, the force of the movement of head H of subject S is absorbed, at least in part, by head and neck restraint assembly 12 thereby avoiding injury to the head H and neck of subject S.

By varying the material and/or thickness of head and neck restraint assembly 12, the capability of head and neck restraint assembly 12 to avoid injury to the head and neck of S can be tuned to the size of the subject S. For example, for a subject S having a larger more massive head H, the material and/or thickness of head and neck restraint assembly 12 can be selected to control deceleration and movement of said head H. Conversely, for the head of a toddler which is lighter, the material and thickness of head and neck restraint assembly 12 can be selected to provide a desirable amount of deceleration in response to a forceful impact to the vehicle in which the toddler is riding.

It is envisioned that the head and neck restraint system 1 discussed above can be applied in a number of situations and versions including child car seats, seats in military vehicles, seats of wheelchairs, seats in aviation, seats in race cars and the like. Accordingly, the invention is not to be construed or limited in any way to use with the child car seat depicted above.

The present invention has been described with reference to the accompanying figures. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of head and neck restraint comprising:
   (a) securing a head of a subject in spaced relation to a pair of spaced arms of a head and neck restraint assembly in a manner that limits movement of the head; and
   (b) in response to sudden force in a first direction, whereupon the head of the subject experiences a force in a second direction and the pair of spaced arms move from starting positions toward each other, the head and neck restraint assembly controlling deceleration of the head in the second direction and avoiding rebounding of the head in the first direction after said deceleration by avoiding the pair of spaced arms from returning to the starting positions.

2. The method of claim 1, wherein step (b) further includes the head and neck restraint assembly further avoiding rotation of the head.

3. The method of claim 1, wherein:
   the subject is seated;
   the first force is directed in a direction from a front to a back of the subject; and
   the second force acts in a direction opposite the first force.

4. The method of claim 1, wherein:
   the subject is seated;
   the first force is directed in a direction laterally, from side-to-side of the subject; and
   the second force acts in a direction opposite the first force.

5. The method of claim 1, wherein step (a) includes securing the head of the subject in spaced relation directly to the pair of spaced arms via at least one cable.

6. The method of claim 1, wherein the controlling deceleration of the head includes the pair of spaced arms moving from the starting positions towards the head of the subject.

7. The method of claim 6, wherein the avoiding rebounding of the head includes the pair of spaced arms not returning to the starting positions.

* * * * *